United States Patent [19]
Kobayashi et al.

[11] Patent Number: 5,770,128
[45] Date of Patent: Jun. 23, 1998

[54] METHOD OF TRANSFER MOLDING AND A TRANSFER MOLDING MACHINE

[75] Inventors: Kazuhiko Kobayashi; Ryoichi Arai; Yasuhiko Miyashita; Kazumi Sawazaki, all of Togura-machi, Japan

[73] Assignee: Apic Yamada Corporation, Nagano, Japan

[21] Appl. No.: 157,114

[22] PCT Filed: Apr. 12, 1993

[86] PCT No.: PCT/JP93/00468

§ 371 Date: Dec. 8, 1993

§ 102(e) Date: Dec. 8, 1993

[87] PCT Pub. No.: WO93/20996

PCT Pub. Date: Oct. 25, 1993

[30] Foreign Application Priority Data

| Apr. 13, 1992 | [JP] | Japan | 4-119697 |
| Aug. 27, 1992 | [JP] | Japan | 4-252114 |
| Nov. 2, 1992 | [JP] | Japan | 4-317810 |
| Dec. 1, 1992 | [JP] | Japan | 4-349916 |
| Dec. 1, 1992 | [JP] | Japan | 4-349917 |

[51] Int. Cl.$^6$ .......................... B29C 45/02; B29C 45/14
[52] U.S. Cl. ...................... 264/39; 264/272.17; 425/210; 425/229; 425/544
[58] Field of Search .......................... 264/272.11, 272.17, 264/275, 39; 425/544, 574, 575, 588, 116, 210, 229

[56] References Cited

U.S. PATENT DOCUMENTS

| 4,347,211 | 8/1982 | Bandoh | 425/544 |
| 4,372,740 | 2/1983 | Kuramochi et al. | 428/544 |
| 4,388,265 | 6/1983 | Bandoh | 425/588 |
| 5,302,101 | 4/1994 | Nishimura | 425/116 |

FOREIGN PATENT DOCUMENTS

| 60-251633 | 12/1985 | Japan | 364/328.5 |
| 62-70011 | 3/1987 | Japan . | |
| 63-185231 | 11/1988 | Japan . | |
| 1-146712 | 6/1989 | Japan . | |
| 2-214629 | 8/1990 | Japan . | |
| 3-274122 | 12/1991 | Japan . | |
| 3-277514 | 12/1991 | Japan . | |

*Primary Examiner*—Angela Y. Ortiz
*Attorney, Agent, or Firm*—Birch, Stewart, Kolasch & Birch, LLP

[57] ABSTRACT

Insert-parts are set onto a lower die (10), and resin tablets are supplied into pots (10a) for resin mold. A press mechanism A molds the insert-parts, a mold is opened, then the lower die (10) is slid to a first position, which is located side of a molding position. At the first position, an unloading mechanism (C) and a parts-loading mechanism (D) execute to clean parting faces of the mold, and to set resin tablets and insert-parts. The lower die (10) returns to the molding position for next molding. By sliding the lower die (10), works of taking out molded products, setting insert-parts, etc. can be easier, and the molding cycle time can be shortened.

15 Claims, 12 Drawing Sheets

METHOD OF TRANSFER MOLDING AND A TRANSFER MOLDING MACHINE

BACKGROUND OF THE INVENTION

The present invention relates to a method of transfer molding and a transfer molding machine for molding insert-parts, e.g., lead frames of semiconductor devices, with resin.

In case of molding lead frames by a transfer molding machine, the steps are: setting lead frames in a lower die; clamping the lead frames by the lower die and an upper die; filling cavities with resin; opening the lower die and the upper die; and taking out molded products. A press unit is provided for opening and closing a mold, which consists of the lower die and the upper die arranged in the vertical direction, and presses are provided to move the mold for each molding work.

Therefore, setting lead frames in the lower die and taking out molded products are executed by a loader or loaders, which are capable of going into the press unit from the side thereof so as to transfer lead frames.

Operating efficiency of the transfer molding machine is basically defined as molding cycle time, so it is quite important for increasing the efficiency to shorten the molding cycle time. Thus, a transfer molding machine with high speed operation has been required.

Actions of a conventional transfer molding machine, which has two loaders: an unloader and a parts-loader, with respect to time is shown in FIG. 19. The horizontal axis stands for time; the vertical axis stands for actions. Graph a stands for opening and closing the mold (the lower die and the upper die): the mold is opened after molding, and the mold is closed again after predetermined time passes. Graph b stands for taking out molded product from the mold. Graph c stands for the movement of the unloader: after the mold is opened, the unloader goes into the press unit, chucks molded products and comes out therefrom. Graph d stands for the movement of the parts-loader: the parts-loader sets next lead frames into the lower die after the unloader took out the molded products. After the parts-loader sets the lead frames, the mold is closed. In the conventional high speed type transfer molding machine, the cycle time will be 15 seconds.

To shorten the cycle time of the transfer molding machine, accelerating speed of opening and closing the mold and travelling the unloader and the parts-loader has been proposed, but the speed of opening and closing the mold is limited, in other words, shortening the cycle time of the conventional transfer molding machine is limited.

As shown in FIG. 19, in the actions of the conventional transfer molding machine, for example, the unloader starts to move after the lower die and the upper die completely opened, the parts-loader moves after the movement of the unloader, namely the actions are sequentially executed. The reason why the actions must be sequentially executed is that the unloader and the parts-loader must be operated while the mold is opened, so that the cycle time of the conventional transfer molding machine cannot be efficiently shortened.

Furthermore, in the conventional transfer molding machine, parting faces of the lower die and the upper die are cleaned by the unloader, so the cleaning must be executed after the lower die are and the upper die completely opened, if the positions of the parting faces are not fixed when they are cleaned, effective cleaning cannot be executed.

SUMMARY OF THE INVENTION

An object of the present invention is to provide a method of transfer molding and a transfer molding machine, which are capable of shortening the cycle time and increasing production efficiency by effective operation of opening and closing the mold, movement of the loaders without accelerating the speed thereof.

To achieve the object, the present invention has following constitutions.

Firstly, a method for transfer molding,
in a transfer molding machine comprising:
a mold having an upper die and a lower die;
a plurality of pots being provided in said lower die; and
a plurality of plungers being provided in each said pot, said plungers being capable of moving in said pots,
said method comprising the steps of:
setting insert-parts into said mold;
supplying resin tablets into said pots;
clamping said insert-parts by said upper die and said lower die; and
exerting pressure on resin melt by said plungers, so as to fill cavities in said mold with said resin,
characterized in that:
said insert-parts are clamped and molded at a molding position at which said upper die and said lower die can be faced relative to each other;
after molding, said mold is opened and said lower die is simultaneously moved to a first position, which is side of the molding position; and
at the first position, molded products are taken out from said lower die, insert-parts for next molding are set, and resin tablets for next molding are supplied, then said lower die is returned to the molding position for next molding.

On the other hand, a transfer molding machine of the first structure comprising:
a mold having an upper die and a lower die, said mold being capable of clamping insert-parts, which are set in said lower die, by said upper die and said lower die;
a plurality of pots being provided in said lower die; and
a plurality of plungers being provided in each said pot, said plungers being capable of moving in said pots and exerting pressure on resin melt so as to fill cavities in said mold with said resin,
characterized in that:
said lower die is capable of moving between a molding position, at which said insert-parts are clamped and molded by said mold, and a first position, which is positioned on a side of the molding position; and
said transfer molding machine further comprises:
a multi function mechanism for taking out molded products from said lower die, setting said insert-parts thereinto and supplying said resin tablets at the first position; and
a moving mechanism for sliding said lower die between the molding position and the first position.

A transfer molding machine of the second structure, comprising:
a parts-loading mechanism for transferring insert-parts and setting the same to a mold; and
a hand for chucking said insert-parts and lining up the said insert parts.

A transfer molding machine of the third structure, comprising:
a tablet magazine in which resin tablets to be supplied into pots are piled;
a tablet-supplying holder having tablet holes, which are arranged to correspond to the arrangement of said pots, said tablet-supplying holder being capable of moving toward said tablet magazine; and a transferring mechanism for transferring said resin tablets from said tablet magazine into the tablet holes of said tablet-supplying holder.

BRIEF DESCRIPTION OF THE DRAWINGS

An embodiment of the present invention will now be described by way of examples and with reference to the accompanying drawings, in which:

FIG. 12 (b) is a plan view of a lift plate;

DETAILED DESCRIPTION OF A PREFERRED EMBODIMENT

Detailed description of a preferred embodiment of the present invention will now be described in detail with reference to the accompanying drawings.

In a transfer molding machine of the present embodiment, a lower die is capable of horizontally sliding between a molding position at which insert-parts are molded by resin and a first position, which is an outer side of the molding position. An upper die and the lower die are faced for each molding, and the lower die is reciprocally moved between the molding position and the first position. Leadframes, which are insert-parts, are transferred onto the lower die, which has been pulled out from the press unit, for molding.

Figure 1:
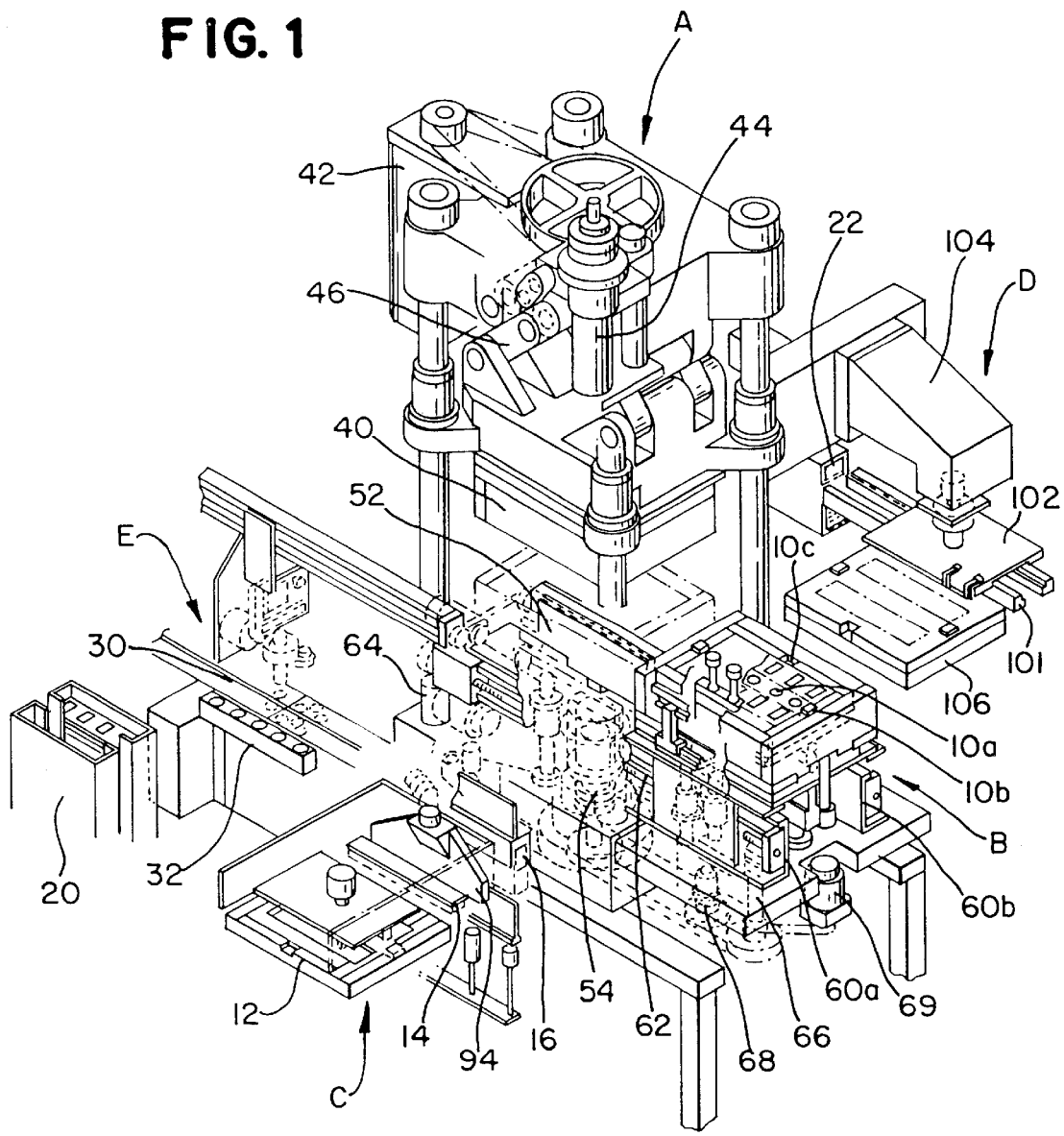
FIG. 1 is a perspective view of a transfer molding machine of an embodiment.

The whole structure of the transfer molding machine of the present embodiment is shown in FIG. 1. The transfer molding machine has a press mechanism A, which is capable of clamping lead frames for molding, a moving mechanism B, which is capable of moving the lower die toward the first position, which is adjacent to a side of the press mechanism A, an unloading mechanism C and a parts-loading mechanism D, which are capable of transferring lead frames, etc. to and from the lower die, which has been located at the first position, and a tablet-supplying mechanism E, which is capable of supplying resin tablets to the unloading mechanism C.

Figure 2:
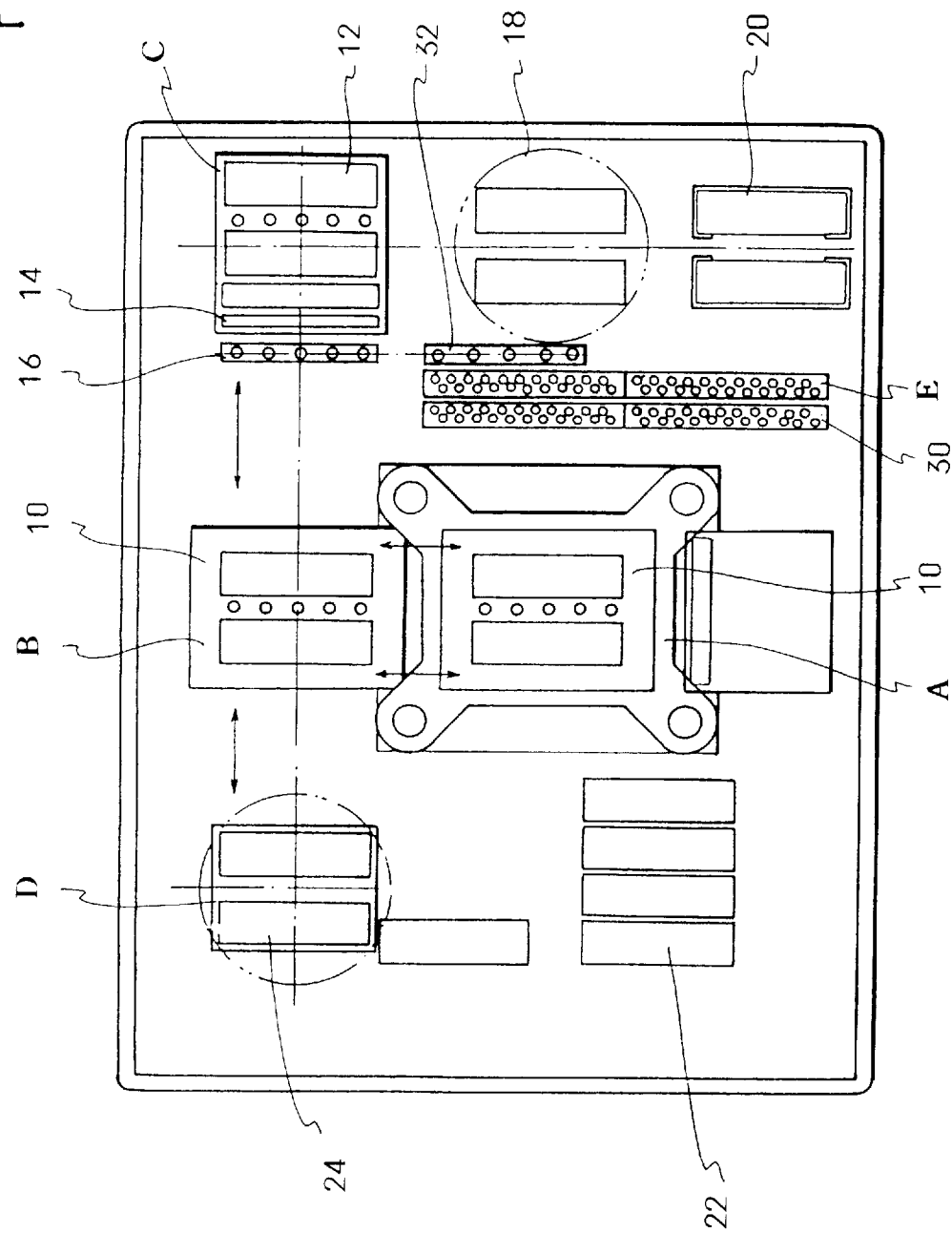
FIG. 2 is a plan view of the transfer molding machine.

FIG. 2 shows a plan view of the transfer molding machine. The press mechanism A is provided in a center part; the unloading mechanism C and the parts-loading mechanism D are located on each side of the lower die 10, which has been moved from the molding position in the press mechanism A to the first position.

The unloading mechanism C has a degating section 12, which is capable of removing scraps from molded lead frames, a lower die cleaner 14 for cleaning a parting face of the lower die 10, and a tablet holder 16 for supplying resin tablets. Note that, a pick-up section 18 carries the lead frames, which have been degated, into magazines 20.

The parts-loading mechanism D has magazines 22 into which the molded lead frames are accommodated, and an arranging section 24, which is capable of arranging a couple of lead frames in parallel.

The tablet-supplying mechanism E is located at a side of the press mechanism A, and has tablet magazines 30, in which resin tablets are piled, and a tablet-supplying holder 32.

The transfer molding machine of the present embodiment is capable of automatically molding by combination of the press mechanism A, the moving mechanism B, the unloading mechanism C, the parts-loading mechanism D and the tablet-supplying mechanism E.

Detailed structure of each mechanism will be explained.

[The Press Mechanism And The Moving Mechanism]

The press mechanism A is capable of clamping lead frames by a mold, which consists of the upper die and the lower die, and filling cavities, which are formed in the mold, with resin so as to mold the lead frames.

Figure 3:
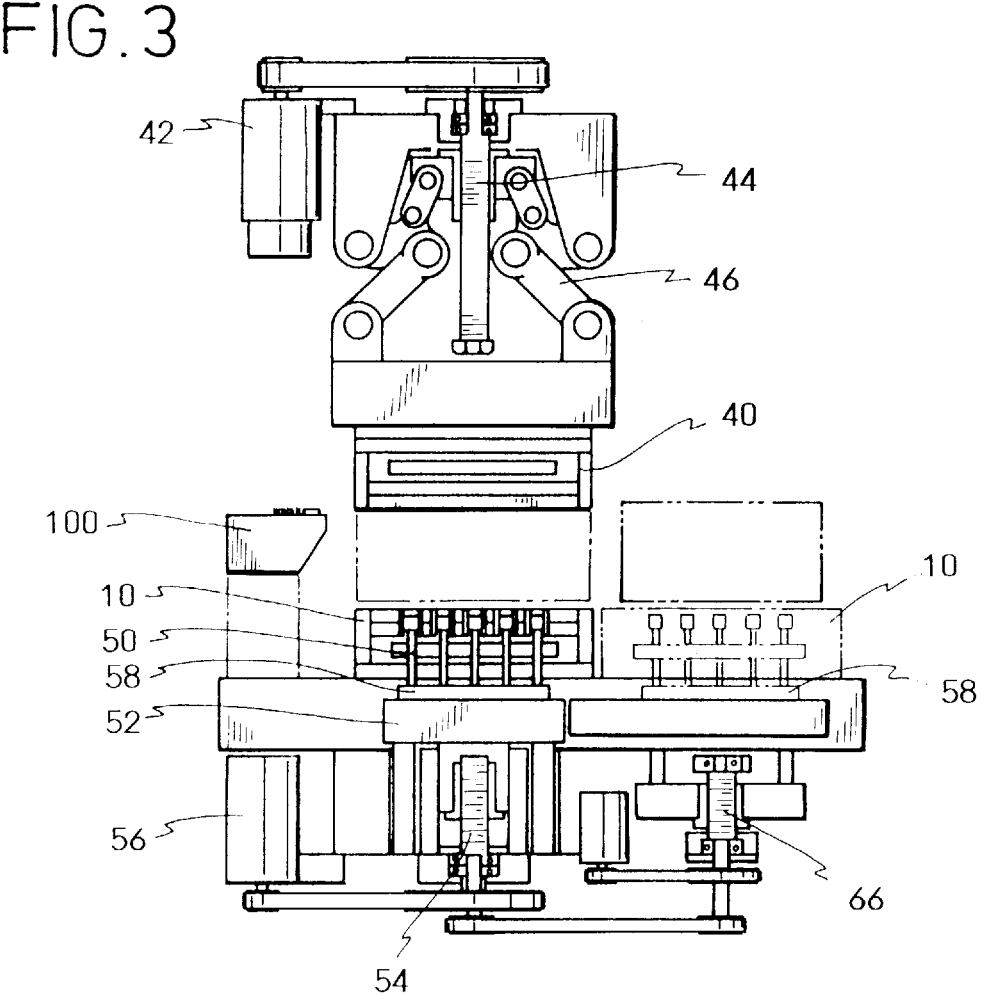
FIG. 3 is a side view of a press unit.

A side view of the press mechanism A is shown in FIG. 3. The upper die 40 is vertically moved by a motor, namely a motor 42 rotates a ball bearing screw 44, so that the mold is opened and closed by a link mechanism including toggle units 46, etc. . . .

The mold in the present embodiment is a multi-pot type mold, namely plungers 50 are slidably provided in pots 10a, which are provided in the lower die 10. A plunger-pressing mechanism, which presses the plungers 50 so as to exert resin melt in the pots 10a and to fill the cavities with the resin, is located below the lower die 10. The plunger-pressing mechanism has a platen 52, which is capable of moving in the vertical direction and supporting base sections of the plungers 50, a ball bearing screw 54, which is capable of pressing the platen 52, and a motor 56 for rotating the ball bearing screw 54.

As described above, the lower die 10 is capable of reciprocally moving between the press mechanism A and the first position. Thus, even if the plungers 50 are fitted in the pots 10a, the lower die 10 is capable of moving toward the first position. The base sections of the plungers 50 are fixed to and supported by a plunger holder 58 with T-slot, and the plunger holder 58 is capable of engaging with an upper section of the platen 52.

Figure 4:
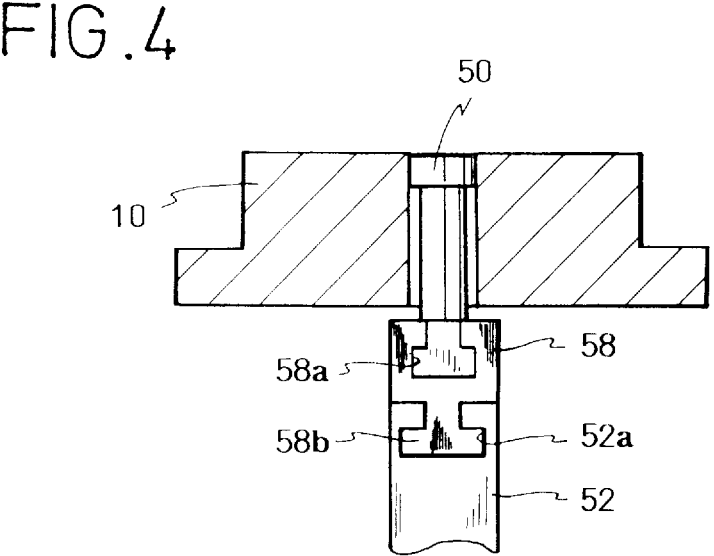
FIG. 4 is a sectional view showing a plunger in a lower die.

Means for supporting the plungers 50 by the plunger holder 58 will be shown in FIG. 4. The plunger holder 58 has a T-slot 58a, which has a T shape in section and formed from one end to the other end in the longitudinal direction, in an upper section. There is provided an engaging section 58b, which has a T shape in section, on a bottom face of the plunger holder 58. The engaging section 58b is capable of slidably fitting into a T-groove 52a, which is formed in the upper section of the platen 52, from one side.

Since the T-slot 58a is formed from one end to the other end of the plunger holder 58, the plungers 50 can be changed, so that the plunger holder 58 can be applied to other molds, whose plunger arrangement is different. When the plunger 50 is turned on its axial line, the engagement between the T-slot 58a and the plunger 50 is released, so that the plunger 50 can be pulled out upward.

In FIG. 1, guide sections 60a and 60b are capable of supporting the lower die 10 by bottom faces of their edge sections during movement of the lower die 10. There are provided ball bearing screws 62, which are driven by motors 64, for moving the lower die 10 on outer side faces of the guide sections 60a and 60b.

After molding is executed in the press mechanism A, the mold is opened and the lower die 10 is moved from the molding position to the first position by the motors 64, then lead frames are transferred there. After transferring the lead frames and setting resin tablets, the lower die 10 is returned to the molding position by the motors 64 for the next molding. The lower die 10 is reciprocally moved to synchronize the movement of the press mechanism by the motors 64.

At the first position, which is adjacent to a side of the press mechanism A, molded products are ejected from the lower die 10. In FIG. 1, a ball bearing screw 66 vertically moves the plungers 50; a ball bearing screw 68 presses ejector pins. The ball bearing screw 66 is driven by a motor 56, which is provided to the press mechanism A; the ball bearing screw 68 is driven by a motor 69.

When the molded products are ejected from the lower die 10, the plungers 50 are moved upward by the ball bearing screw 66, and the ejector pins are simultaneously pressed to eject the molded products by the ball bearing screw 68. To receive next resin tablets, the plungers 50 are moved downward before next resin tablets are introduced.

Note that, as described above, the lower die 10 can be slid sideward together with the plungers 50, so a molding section 80 can be easily changed when, for example, molded products are changed.

Figure 5:
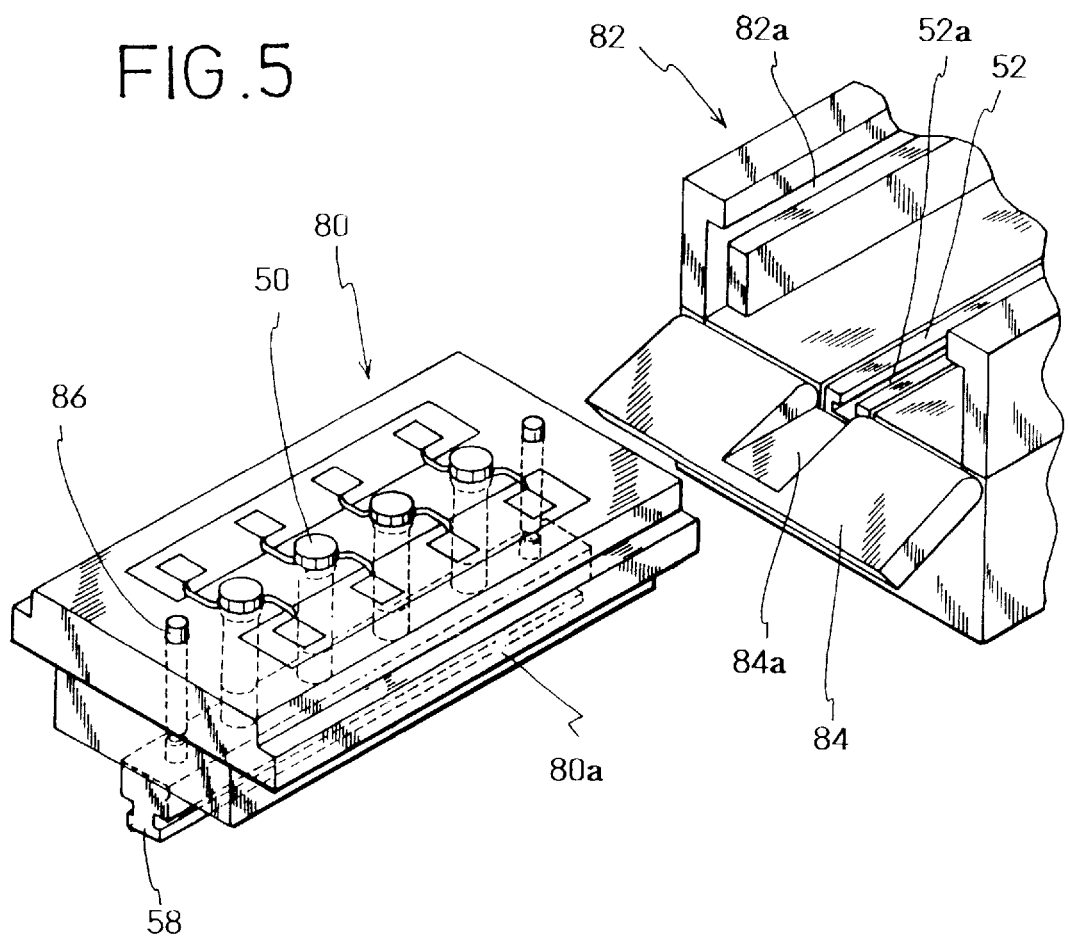
FIG. 5 is a partial perspective view showing a molding section in the lower die.

In FIG. 5, the molding section 80 of the lower die 10 and a lower die base 82 in which the molding section 80 is set are shown. As described above, the plungers 50 are slidably fitted in the pots 10a of the molding section 80, and the base sections of the plungers 50 are fixed to the plunger holder 58. Note that, The T-slot 58a is not always necessary to support the plungers 50, namely they may be fixed at predetermined positions. The plungers 50 are projected from an upper face of the molding section 80, so they can be detached from and attached to the plunger holder 58 by turning on their axes. Thus, the plungers 50 can be selectively exchanged when some plungers 50 are damaged.

Note that, preferably the molding section has a resin pressure adjusting mechanism. The resin pressure adjusting mechanism has, for example, pots and connecting resin paths, which mutually connect pots and culls.

The molding section 80 can be slid and fitted into the lower die base 82 from one side. Therefore, there is formed a horizontal dove tail groove 82a on an inner face of the lower die base 82; there is formed a dove tail 80a, which can be engaged with the dove tail groove 82a, on an outer side face of the molding section 80.

A shutter 84 is provided to one end of the molding section 80 from which the molding section 80 is fitted. The shutter 84 can be turned on its base section so as to open and close the one end of the lower die base 82. There is formed a groove 84a, through which the plunger holder 58 passes when the molding section 80 is fitted into the lower die base 82, on an inner face of the shutter 84.

There is formed a long hole, into which the upper section of the platen 52 is slidably fitted, in a center part of the bottom section of the lower die base 82. In FIG. 5, the upper section of the platen 52 is fitted in the long hole.

When the molding section 80 is set into the lower die base 82, the shutter 84 is opened to allow the molding section 84 to slide sideward, then the molding section 80 is set therein and the shutter is closed.

The molding section 80 is capable of reciprocally moving between the press mechanism A and the first position together with the lower die base 82, and the plunger holder 58 engages with the T-groove 52a of the platen 52 while the lower die 10 moves from the first position to the press mechanism A, so that the platen 52 and the plunger holder 58 are connected and the plungers 50 are pressed by the platen 52.

Figure 6:
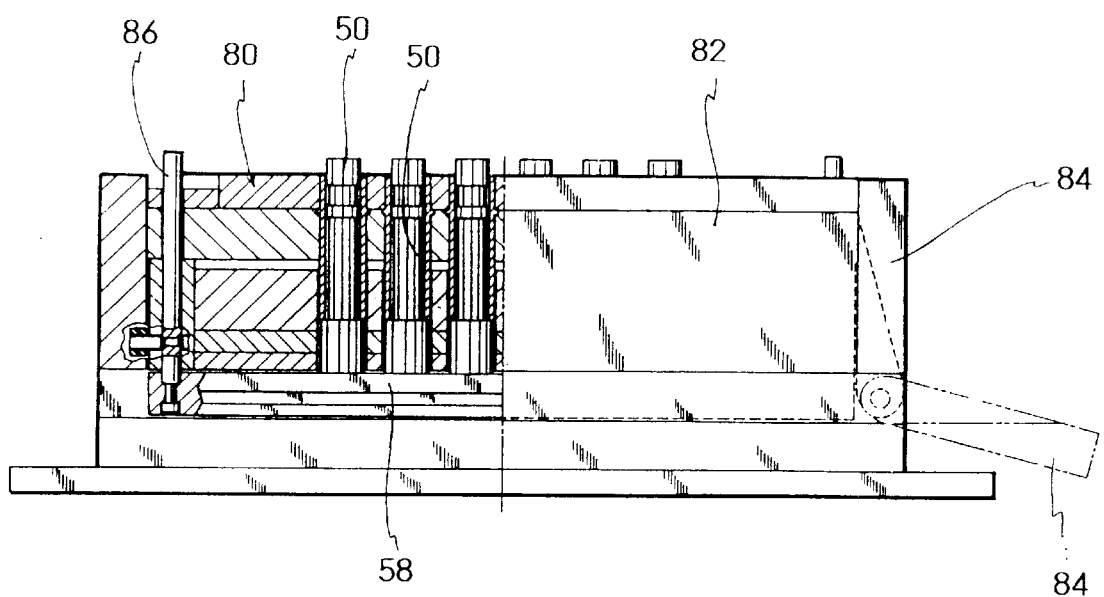
FIG. 6 is a front view of the lower die, with a portion broken away for clarity.

FIG. 6 is a front view of the lower die base 82 with the molding section 80, with a portion broken away for clarity. The molding section 80 can be attached and detached by opening and closing the shutter 84, thus the molding section 80 can be attached to and detached from the lower die base 82. Namely, the molding section 80 can be changed according to products.

Figure 7:
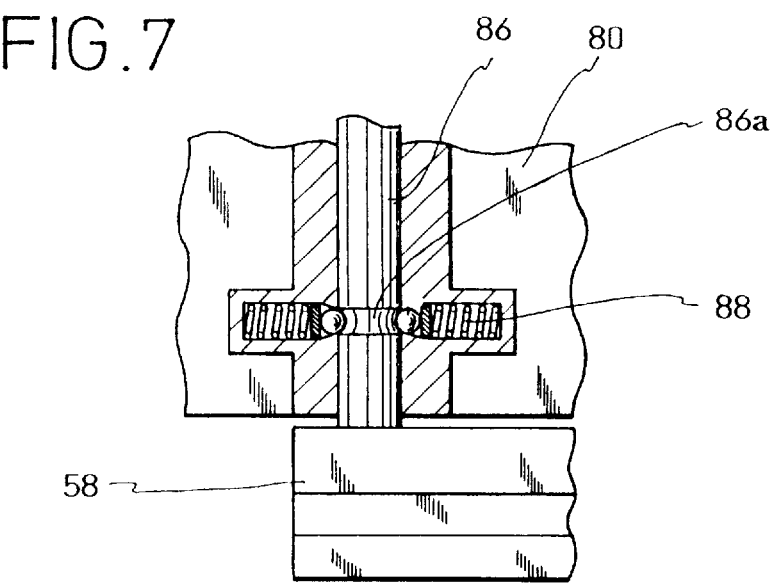
FIG. 7 is a partial sectional view showing connecting means of the plunger in the lower die.

FIG. 7 is a partial sectional view showing connecting means of the plungers 50, which is capable of securing the plungers 50 in the molding section when the molding section 80 is changed. Linked pins 86 are provided at both end sections of the plunger holder 58 and extended upward. Each linked pin 86 has a round groove 86a, with which a ball plunger 88 in the molding section 80, on an outer circumferential face. The ball plunger 88 is biased toward the round groove 86a by a spring, so that the plunger holder 58 is fixed to the molding section 80. If the plunger holder 58 is pulled, the plunger holder 58 is easily detached.

[The Unloading Mechanism]

When the lower die 10 is located at the first position, taking out molded products, setting next lead frames, supplying next resin tablets and cleaning the mold are executed.

As shown in FIG. 2, the unloading mechanism C is provided at the position, which is adjacent to a side of the lower die 10 pulled out, so that the unloading mechanism C is capable of moving between the position above the first position, at which the lower die 10 when pulled out will be located, and a first shunting position, which is side of the first position. The unloading mechanism C has, as described above, the degating section 12, the lower die cleaner 14 and the tablet holder 16, and executes to take out molded products from the lower die 10, to degate the molded products, to clean the parting face of the lower die 10 and to supply resin tablets into the lower die 10.

Figure 8:
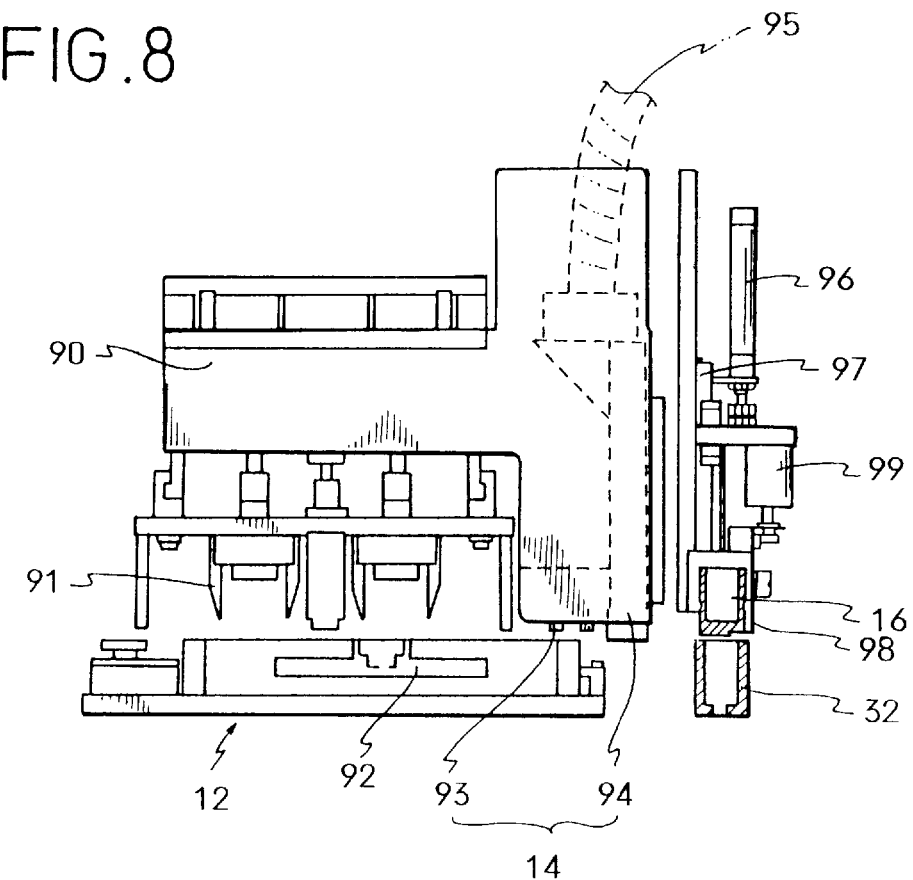
FIG. 8 is a side view of an unloading mechanism.

FIG. 8 is a side view of an unloading mechanism C located at the first shunting position. The unloading mechanism C has a supporting frame 90, and the degating section 12 has chucking sections 91, which are located under the supporting frame 90, and a degating stage 92, which is located under the chucking sections 91. The degating stage 92 is fixed; the chucking sections 91, which is supported by the supporting frame 90, can be moved. In the present embodiment, two lead frames are simultaneously molded, so two chucking sections 91 are provided.

The lower die cleaner 14 is provided in the supporting frame 90, close to the lower die 10. The lower die cleaner 14 has brushes 93 for brushing the parting face of the lower die 10 and a vacuum duct 94. As shown in FIG. 1, a lower end of the vacuum duct 94 is opened, and the opening section is formed into an oblong. The vacuum duct 94 sucks resin dust, etc. while reciprocally moving over the parting face of the lower die 10. A hose 95 is connected to a vacuum unit.

The tablet holder 16 is fixed on an outer side face of the supporting frame 90 on the lower die 10 side. In FIG. 8, an air cylinder 96 drives a pusher, which pushes resin tablets in a holder downward. The pusher is guided by a guide 97. A shutter plate 98 holds resin tablets in the tablet holder 16. An air cylinder 99 drives the shutter plate 98 to open and close.

The tablet holder 16 transfers resin tablets, which have been supplied from the tablet-supplying mechanism E, to the lower die 10. The tablet-supplying holder 32 moves from the tablet-supplying mechanism E to the position immediately below the tablet holder 16 while the unloading mechanism C is located at the first shunting position. When the tablet-supplying holder 32 reaches the position immediately below the tablet holder 16, a lift plate is pushed upward and inserted into the tablet-supplying holder 32, then resin tablets are supplied into the tablet holder 16. When the resin tablets are pushed into the tablet holder 16, the air cylinder 99 is driven so as to insert the shutter plate 98 below the resin tablets to prevent the resin tablets from falling down.

Figure 9:
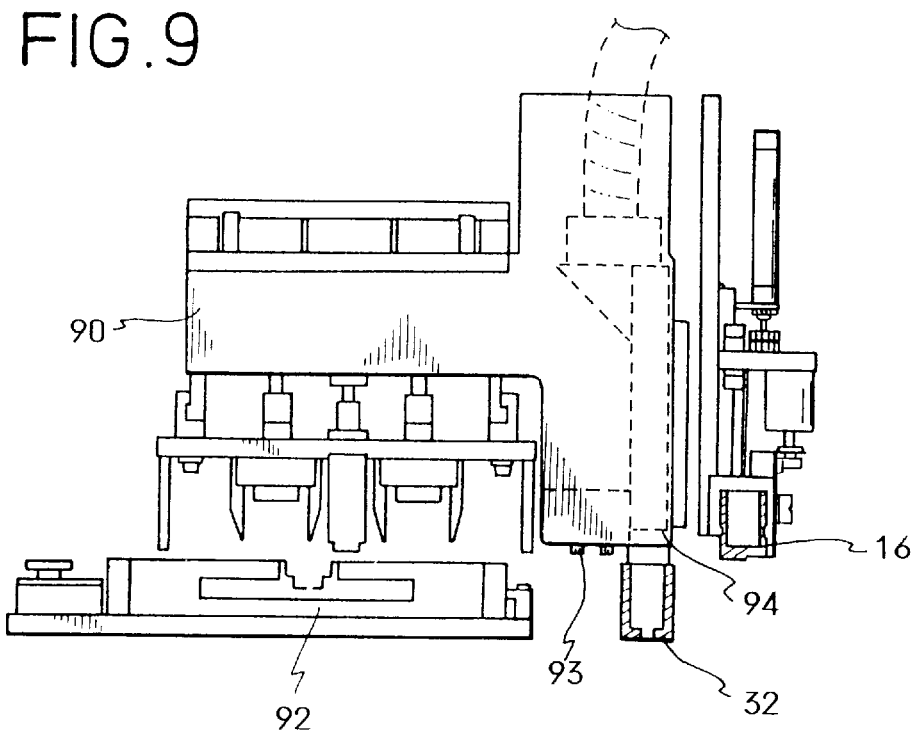
FIG. 9 is a side view of an unloading mechanism, which is in a state of cleaning a tablet holder.

After the resin tablets are transferred from the tablet-supplying holder 32 to the tablet holder 16, the vacant tablet-supplying holder 32 will be cleaned. The state of cleaning the tablet-supplying holder 32 is shown in FIG. 9. Resin dust is apt to adhere on the tablet-supplying holder 32 because of transferring the resin tablets, so the inner space of the tablet-supplying holder 32 must be cleaned.

On the way to the lower die 10, the unloading mechanism C once stops when the vacuum duct 94 reaches the position above the tablet-supplying holder 32. Then the vacuum unit is driven so as to clean the tablet-supplying holder 32. With this structure, the lower die cleaner 14 is also capable of cleaning the tablet-supplying holder 32, so that the total structure of the machine can be simpler.

After cleaning, the tablet-supplying holder 32 returns to the position, which is adjacent to a side of the tablet magazines 30, for next transferring.

After the tablet-supplying holder 32 is cleaned, the unloading mechanism C once stops and waits at the position above the first position until the lower die 10 moves. The chucking sections 91 chuck molded products on the parting face of the lower die 10. The parting face is cleaned by the steps of brushing the parting face with the brushes 93 while the unloading mechanism C returns and sucking resin dust on the parting face with the vacuum duct 94. Upon the unloading mechanism C reaching the pots 10a, the tablet holder 16 opens the shutter plate 98 and the air cylinder 96 drives the pusher to press resin tablets into the pots 10a.

After the unloading mechanism C is returned to the first shunting position, degating is executed at the degating stage 92, so that resin scraps, which are adhered on lead frames, are removed. The lead frames degated are picked up by the pick-up section 18 and transferred into the magazines 20.

As described above, the sequential works are executed while the unloading mechanism C reciprocally moves between the position above the lower die 10 and the first shunting position.

Note that, the unloading mechanism C cleans the parting face of the lower die 10 but the parting face of the upper die 14 is cleaned, as shown in FIG. 3, by an upper die cleaner 100, which goes into the press mechanism during the movement of the lower die 10 to the first position or after the lower die 10 reaches the first position. In the present embodiment, the lower die cleaner moves in the direction perpendicular to the moving direction of the upper die cleaner, so positioning blocks, which can be mutually engaged so as to define mutual positions of the upper die and the lower die, which can be provided without obstructing the movement of the cleaners. The positioning blocks are provided at the center of each edge of the molding section so as to prevent displacement of the mold caused by thermal expansion. If the positioning blocks are provided in a track of the cleaner, the movement of the cleaner is obstructed. But in the present embodiment, there are provided positioning blocks 10b, which project upward from the parting face, at both longitudinal ends of the molding section of the lower die 10; there are formed concave sections 10c, which are capable of engaging with the positioning blocks of the upper die, and between which the brushes 93 pass, at both transverse ends thereof. On the other hand, in the upper die, there are provided positioning blocks at both transverse ends of the molding section; there are formed concave sections at both longitudinal ends thereof, so that the positioning blocks do not obstruct the cleaning work. Note that, in the transfer molding machine of the present embodiment, the lower die 10 and the upper die 40 are alternatively sucked by the vacuum unit for cleaning, so sucking efficiency can be increased.

[The Parts-loading Mechanism]

The parts-loading mechanism D lines up lead frames and supplies them to the lower die 10. In FIG. 1, the parts-loading mechanism D has rails 101 for supporting the lead frames supplied from the magazines 22, a hand 102 for chucking two lead frames, an actuator 104 for transferring the lead frames to the lower die 10 and a preheater 106.

Figure 10:
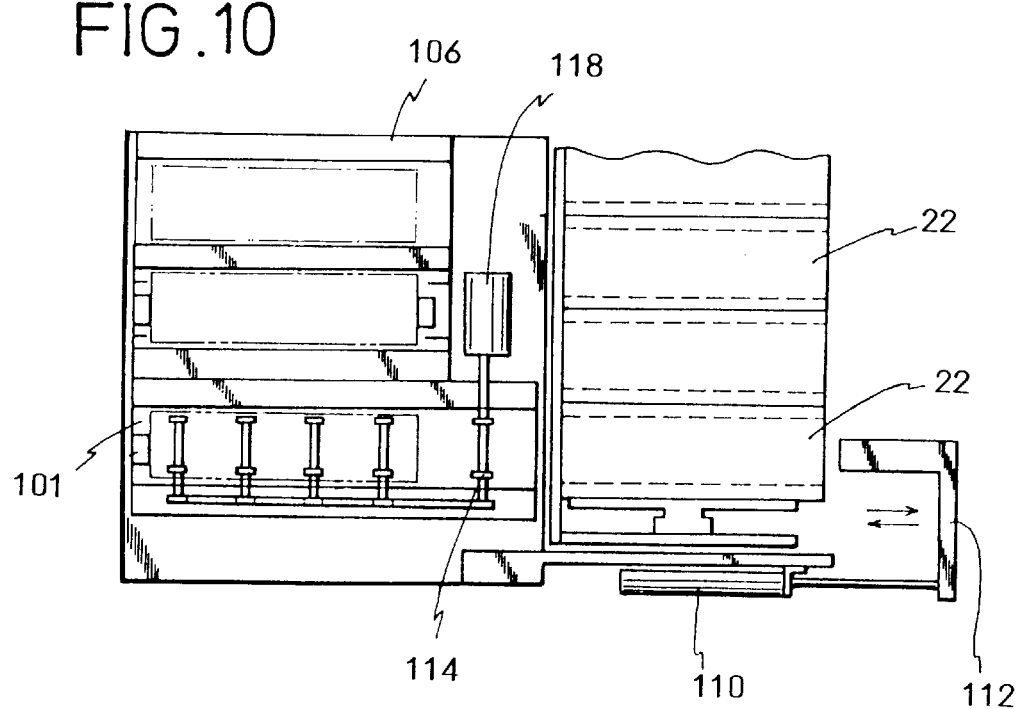
FIG. 10 is a plan view of a parts-loader mechanism.
Figure 11:
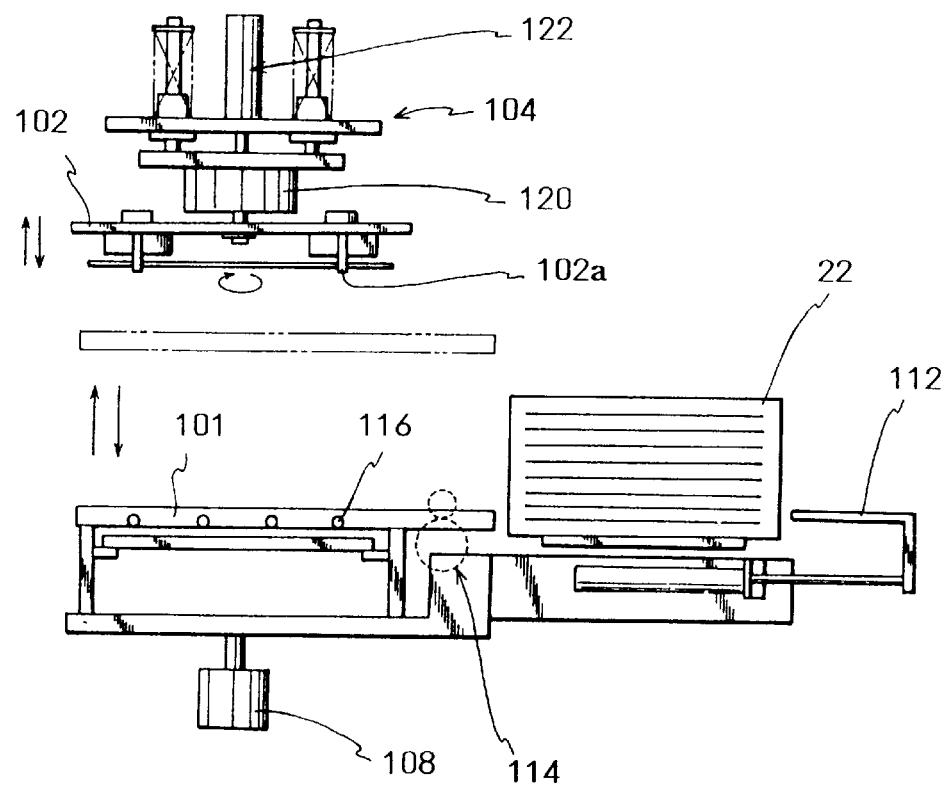
FIG. 11 is a side view of the parts-loader mechanism.

FIG. 10 is a plan view of the parts-loading mechanism D; FIG. 11 is a side view thereof. The magazines 22 for accommodating lead frames are arranged in parallel. The rails 101 are located to correspond to front openings of the magazines 22. As shown in FIG. 11, the height of the rails 101 will be changed by a motor 108 so as to coincide with the height of the lead frames supplied from the magazines.

There is provided a pusher 112, which is driven by an air cylinder 110, behind the magazines 22. The pusher 112 is linked with the rails 101 and vertically moved so as to push out the lead frames from the magazines 22 toward the rails 101. The rails 101 have rollers 114 and 116. Front ends of the lead frames, which have been pushed out from the magazines 22, are pinched by the rollers 114, then the rollers 114 and 116 are rotated by a motor 118 to set the lead frames onto the rails 101.

The hands 102 is located above the rails 101 and supported by a rotary actuator 120 and a vertical actuator 122. As shown in FIG. 11, there are provided chucking sections 102a, which are capable of holding lead frames by chucking their side edges, on a bottom face of the hand 102. Two chucking sections 102a are arranged in parallel so as to simultaneously chuck two lead frames.

The preheater 106 preheats lead frames prior to transferring them onto the lower die 10. Two lead frames can be simultaneously set onto the preheater 106.

Next, action of the parts-loading mechanism D will be explained. The rails 101 descends to the height of the lead frames supplied from the magazines 22. The pusher 112 pushes out the lead frames onto the rails 101 until reaching a stopper for positioning. The rails 101 once ascends the position below the hand 102 to pass the lead frames to the hand 102. Then the rails 101 descends again for receiving nextlead frames. On the other hand, the hand 102 is rotated in a 180-degree by the rotary actuator 120. The lead frames received on the rails 101 are chucked by another chucking sections 102a.

Next, the lead frames chucked by the hand 12 are transferred onto the preheater 106. The lead frames are preheated by the preheater 106, and chucked again so as to be transferred onto the lower die 10, which has been pulled out from the press mechanism A.

Transferring the lead frames by the parts-loading mechanism D is executed after the unloading mechanism C cleans the lower die and sets resin tablets. When the hand 102 reaches the position above the lower die 10, the actuator 122 operates to set the lead frames onto the lower die 10.

In conventional transfer molding machines, lead frames are lined up by rotary tables, etc. . . . But lead frames are lined up by a hand 102 for chucking and transferring in the present embodiment.

[The Tablet-supplying Mechanism]

The tablet-supplying mechanism E supplies resin tablets to the unloading mechanism C. The tablet-supplying mechanism E has the tablet magazines 30, which are provided adjacent to a side of the press mechanism A, and a unit for transferring resin tablets from the tablet magazines 30 to the tablet-supplying holder 32.

In the present embodiment, the tablet magazines 30 are, as shown in FIG. 2, arranged into four lines. The tablet-supplying holder 32, which transfers the resin tablets from the tablet magazines 30 to the unloading mechanism C, has tablet holes for accommodating the resin tablets, which are bored to correspond to the pots 10a of the lower die 10. And the tablet-supplying holder 32 are capable of linearly and reciprocally moving between a position side of the magazines 30 and the unloading mechanism C.

Figure 12A:
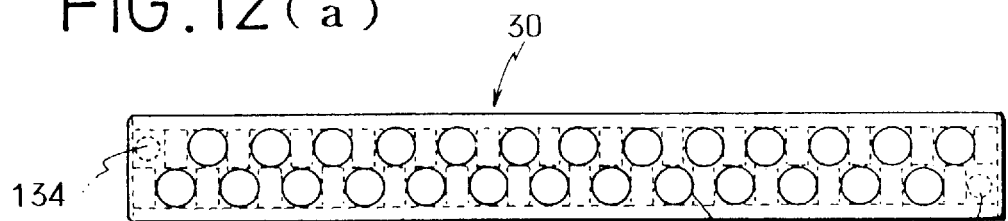
FIG. 12 (a) is a plan view of a tablet magazine.

FIG. 12(a) is a plan view of the tablet magazines 30. Resin tablets are lined up in two lines, and arranged in a zigzag form so as to effectively use a space. There are provided vertical partitions 130a, which are arranged in a zigzag pattern to correspond the zigzag arranging pattern of the resin tablets. The resin tablets are piled and set in divided spaces, which are divided by the partitions 130a.

Figure 12B:
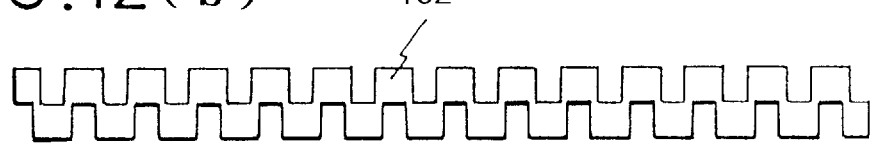

FIG. 12(b) is a plan view of a lift plate 132, which is provided in the tablet magazine 30. The lift plate 132 pushes up the resin tablets for chucking. The lift plate 132 makes possible to chuck the resin tablets in a top layer and then ones in a lower layer. The shape of the lift plate 132 corresponds to the arrangement of the partitions 130a, namely the shape is that of a plurality of squares arranged in a zigzag form and connected to one another.

The lift plate 132 is vertically moved by an elevator, which is provided below the tablet magazine 30, so that the resin tablets supported by the lift plate 132 are lifted. There are bored holes 134, through which pushing rods of the elevator are pierced, at corners of the tablet magazine, which are diagonally separated. The pushing rods lift up the lift plate 132.

On a bottom face of the tablet magazine 30, there are bored the holes 134 only, so as to prevent resin dust from falling therefrom.

Figure 13:
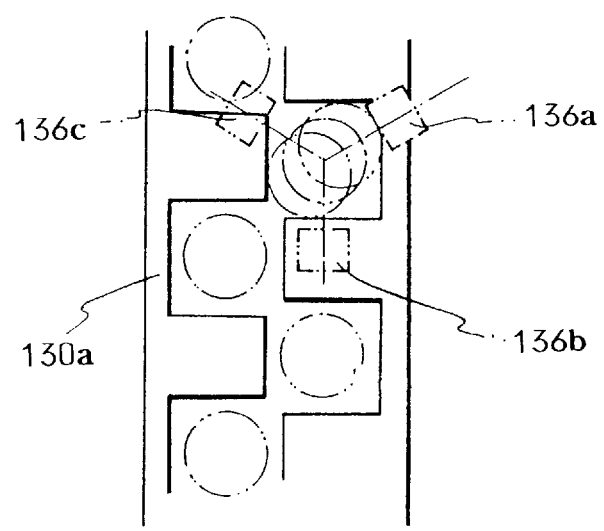
FIG. 13 is an explanation view showing a state of chucking resin tablets in the tablet magazine.

FIG. 13 shows the step of chucking resin tablets. In the present embodiment, a chuck has three chucking claws 136a, 136b and 136c. Thus, centering resin tablets can be precisely executed. With this precise centering, the tablet magazine 30 has an advantage of wide use. Namely, resin tablets having different sizes, which must be accommodated in the inner spaces divided by the partitions 130a, can be precisely centered and transferred to the tablet-supplying holder 32. Note that, in the present embodiment, there are bored holes, whose diameter is almost the same as the clearance between the adjacent partitions 130a, in ceiling plates of the tablet magazines 30.

Figure 14:
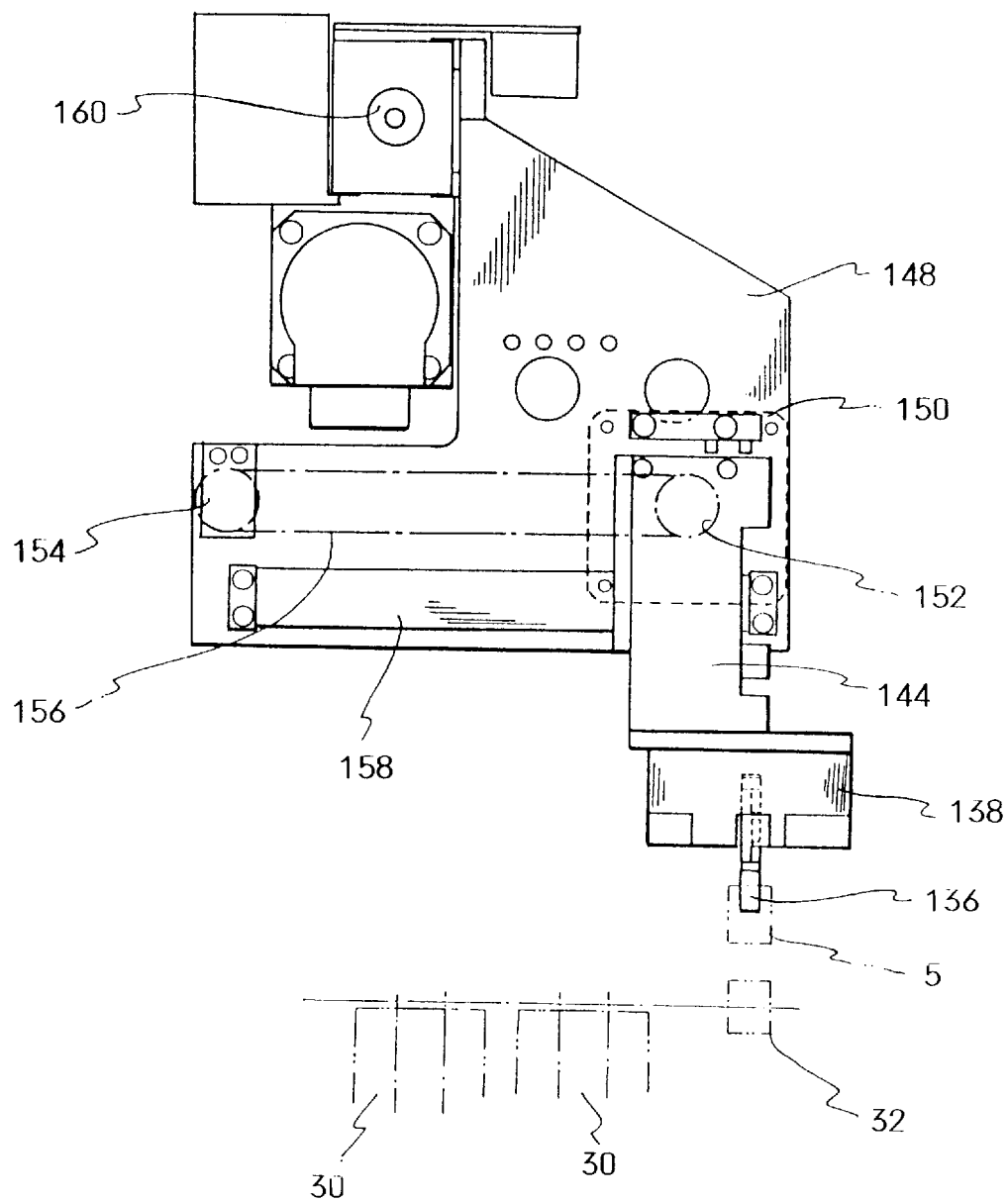
FIG. 14 is a side view of a transferring mechanism.
Figure 15:
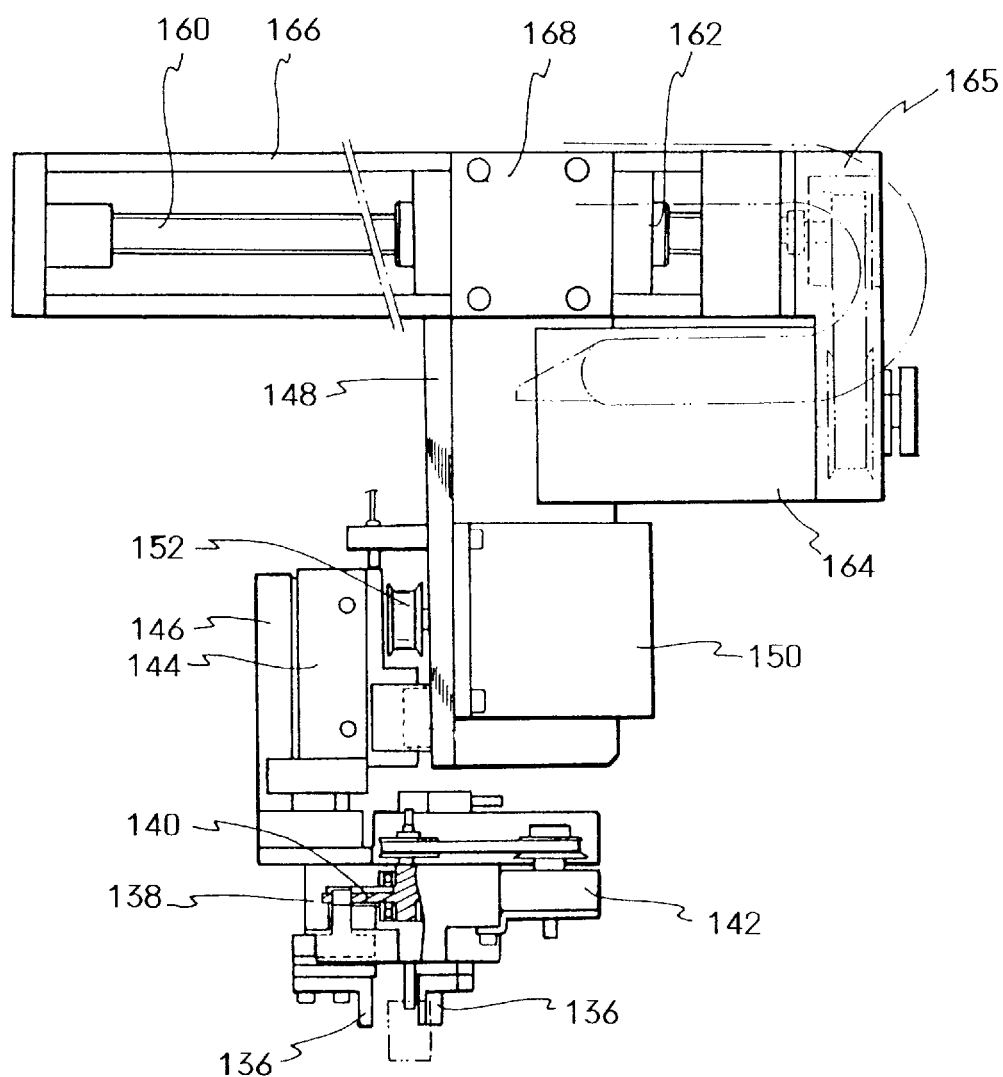
FIG. 15 is a front view of the transferring mechanism.

Next, the transferring mechanism for transferring resin tablets from the tablet magazines 30 to the tablet-supplying holder 32. FIG. 14 is a side view from the tablet magazines 30; FIG. 15 is a front view. The transferring mechanism chucks resin tablets in the tablet magazines 30 and transfers them to the tablet-supplying holder 32, which is located adjacent to a side of the tablet magazines 30. In the present embodiment, the tablet-supplying holder 32 is fixed during transferring; the chucking sections of the transferring mechanism are moved in the X- and Y-directions for transferring resin tablets to the tablet-supplying holder 32 in order.

As shown in FIG. 1, the transferring mechanism is located at the position above the tablet magazines 30, and has the chucking claws 136a, 136b and 136c, a driving section 138 for opening and closing the chucking claws, an X-driving mechanism for moving the chucking mechanism in the transverse direction of the tablet magazines 30 (X-direction), a Y-driving mechanism for moving the chucking mechanism in the longitudinal direction of the tablet magazines 30 (Y-direction), and a vertical driving mechanism for moving the chucking claws in the vertical direction.

In the driving section 138, the chucking claws 136a, 136band 136c are supported and slidably in the radial directions. And, as shown in FIG. 15, upper sections of each claw 136 is engaged with a cam plate 140. The cam plate 140 is driven by an actuator 142 with a belt for opening and closing the claws.

The vertical driving mechanism has, as shown in FIG. 15, a cylinder unit 144, which is capable of supporting the driving section 138, and a guide 146.

The X-driving mechanism has, as shown in FIG. 14, a supporting plate 148, an X-motor 150 attached on a side face of the supporting plate 148, a pulley 152 attached to an output shaft of the X-motor 150, a pulley 154 attached on the side face of the supporting plate 148 with enough separation from the pulley 154 through which the chucking mechanism passes, and a belt 156, to which the cylinder unit 144 is fixed, engaged with the pulleys 154 and 156. The chucking mechanism moved in the X-direction along a linear guide 158.

When the X-motor 150 is driven, the belt 156 moves and the chucking mechanism including the claws 136 is moved in the X-direction. The chucking mechanism is vertically moved between the position where the tablet magazines 30 are set and the position where the tablet-supplying holder 32 is set by the cylinder unit 144, so that resin tablets can be picked up and transferred to the tablet-supplying holder 32.

The Y-driving mechanism has, as shown in FIG. 15, a ball bearing screw 160 arranged in the Y-direction perpendicular to said X-direction, and a ball nut 162. The ball bearing screw is driven by a Y-motor 164 with a belt. The Y-motor 164 is fixed to a block 165, and the supporting plate 148 is fixed to a slide block 168, which is guided by a linear guide 166.

When the Y-motor 164 is driven, the X-driving mechanism, the Y-driving mechanism and the vertical driving mechanism are moved, so that the movement of the chucking claws 136 in the X-direction, the Y-direction and the Z-direction (perpendicular to the X- and Y-directions) is controlled.

As described above, the movement in the X-, Y- and Z-directions and the opening and closing the claws 136a, 136b and 136c are controlled, so that resin tablets can be automatically transferred from the tablet magazines 30 to the tablet-supplying holder 32.

Figure 16:
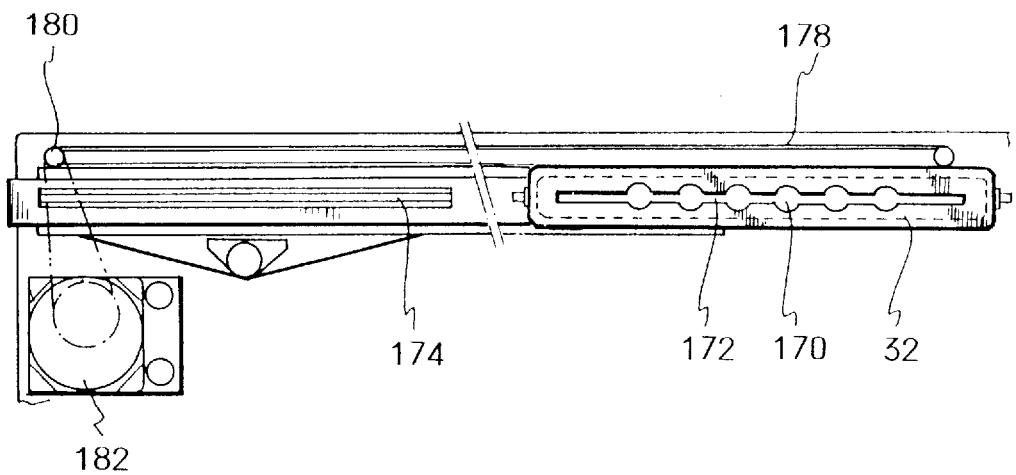
FIG. 16 is a plan view of a moving mechanism.
Figure 17:
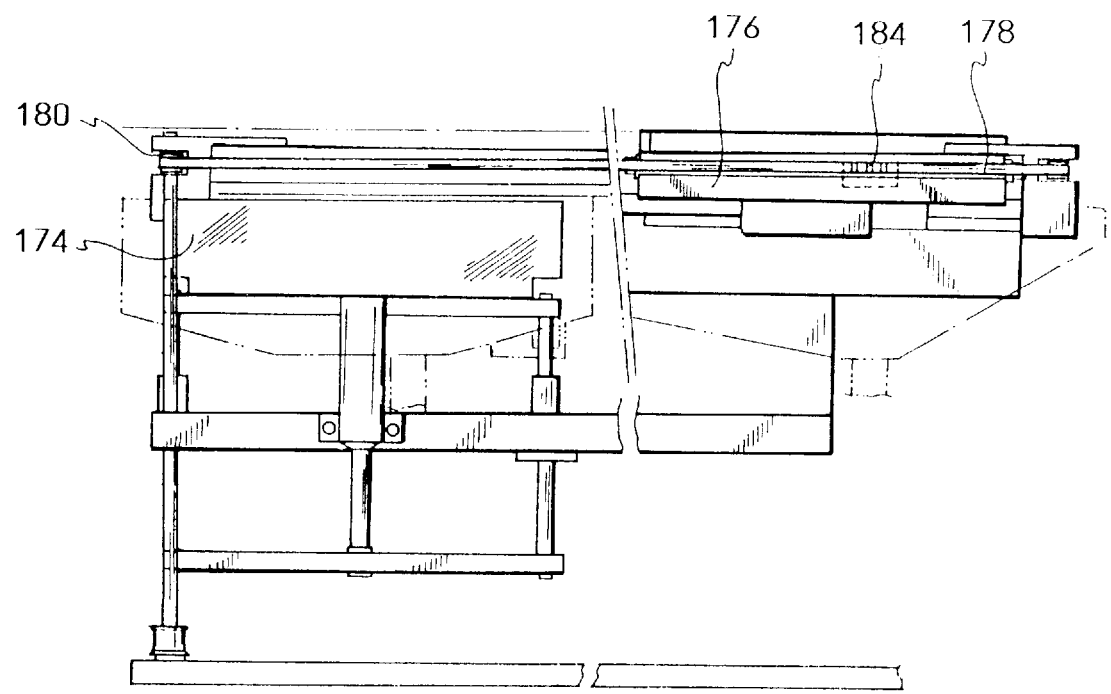
FIG. 17 is a side view of the moving mechanism.

The tablet-supplying holder 32 can be reciprocally moved between the position side of the tablet magazines 30 and the unloading mechanism C. A moving mechanism of the tablet-supplying mechanism 32 is shown in FIGS. 16 and 17. FIG. 16 is a plan view; FIG. 17 is a side view. The tablet magazines 30 is provided on the right side; the unloading mechanism is provided on the left side.

In FIG. 16, tablet holes 170 in which resin tablets are accommodated are bored at positions corresponding to the pots 10a of the lower die 10. The tablet holes 170 are through holes vertically bored in the tablet-supplying holder 32. And the tablet holes 170 are mutually connected a slit 172. A pusher plate 174 is capable of going into the slit 172 when resin tablets are transferred to the tablet holder 16 of the unloading mechanism C. Note that, There are formed engage sections for preventing resin tablets from falling down in the tablet holes 170. Thus, the tablet-supplying holder 32 is detachably attached to a holder frame 176.

In FIG. 17, the holder frame 176 is located at the position below the tablet-supplying holder 32 and moved in the horizontal direction by a belt 178. The belt 178 is engaged with a pulley, which is are provided at both stroke ends of the tablet-supplying holder 32. The pulley 180 is rotated by a motor 182.

As shown in FIG. 17, a clamper 184 fixes the holder frame 176 to the belt 178. The belt 178 is held between the clamper 184 and the holder frame 176, so that the belt 178 moves together with the holder frame 176. An outer side section of the holder frame 176 is slidably engaged with a linear guide, so that the holder frame 176 can be moved horizontally.

Resin tablets are transferred into the tablet holes 170 of the tablet-supplying holder 32, which has been located at the position side of the tablet magazines 30, by the transferring mechanism. The belt 178 is driven by the motor 182, and the tablet-supplying holder 32 is moved to the position below the unloading mechanism C for transferring the resin tablets to the tablet holder 16. After transferring the resin tablets, the tablet-supplying holder 32 returns to the position side of the tablet magazines 30 for a next tablet supply.

In the tablet holder 16, the resin tablets, which correspond to the pots 10a of the lower die 10, are supported, and the unloading mechanism C moves to the position above the lower die 10 for setting the resin tablets into the pots 10a.

Note that, in the present embodiment, since two lines of the tablet magazines 30 are arranged in the transverse direction, if all the resin tablets in the first line are transferred, the resin tablets in the second line will be transferred and the vacant magazines in the first line can be changed, a continuous magazine change or a continuous resin supply can be executed.

[Action of The Transfer Molding Machine]

In the transfer molding machine of the present embodiment, the press mechanism A, the moving mechanism B for moving the lower die 10, the unloading mechanism C, the parts-loading mechanism D and the supplying mechanism E are automatically controlled and a continuous molding can be executed. Next, the action of the machine will be explained.

Figure 18:
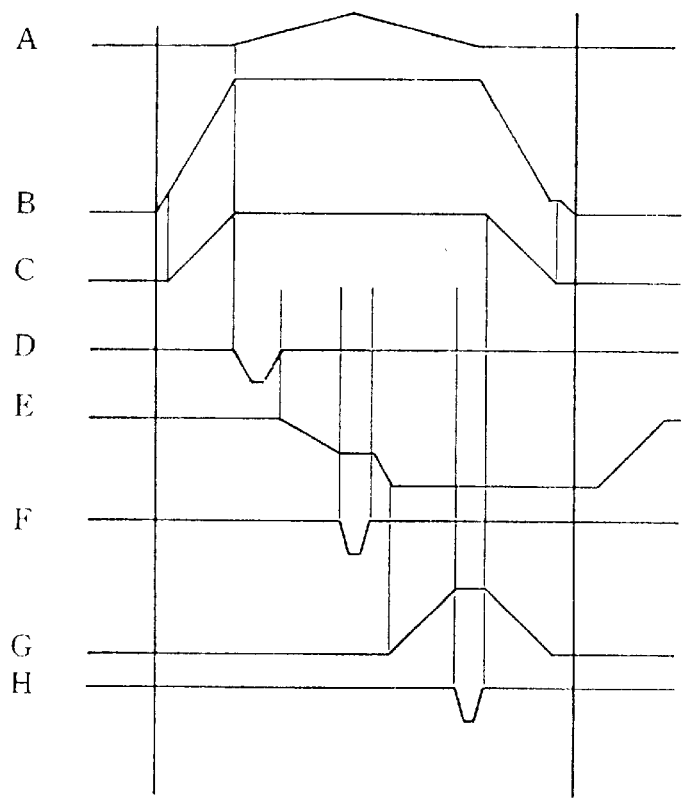
FIG. 18 is a graph showing actions of the transfer molding machine of the embodiment.

FIG. 18 shows an action time chart of parts of the transfer molding machine. Firstly, resin melt is filled in the cavities of the mold. Upon completing the molding work, the motor 42 is driven so as to ascend the upper die 40. Graph B shows the action of the upper die 40.

When the upper die 40 ascends, the lower die 10 moves from the molding position in the press mechanism A to the first position. Graph C shows the action of the movement of the lower die 10. Upon disengaging the positioning blocks of the lower die 10 and the upper die 40, the lower die 10 can be immediately started to move. When the upper die 40 reached the uppermost position, the lower die 10 simultaneously reaches the first position. The upper die cleaner 100 goes into the press mechanism A for cleaning the parting face of the upper die 40 after the lower die 10 moves sideward or while the lower die 10 moves.

The unloading mechanism C moves to the position above the first position before the lower die 10 reaches the first position, and waits for the lower die 10. Graph D shows the action of taking out molded products by the unloading mechanism C. The molded products are taken out immediately after the lower die 10 reaches the first position.

Graph E shows the movement of the unloading mechanism C: the unloading mechanism C cleans the parting face of the lower die 10 and sets resin tablets on the way to the first position. Graph F shows timing of setting resin tablets. After setting resin tablets, the unloading mechanism C returns to an initial position, then degating the molded products and transferring resin tablets from the tablet-supplying mechanism E are executed.

After or while the unloading mechanism C returns to the initial position, the parts-loading mechanism C starts for the lower die 10. Graph G shows the reciprocal movement of the parts-loading mechanism D. Graph H shows the action of setting lead frames by the parts-loading mechanism D.

When the parts-loading mechanism D starts to return, the lower die 10 simultaneously also starts to return to the press mechanism. The upper die 40 also simultaneously starts to descend. Since no interference between the parts-loading mechanism D and the lower die 10 is caused, so the both can be moved simultaneously, and the upper die 40 can start to descend without reference to the parts-loading mechanism D.

When the lower die 10 returns to the molding position, the upper die 40 once stops to descend and clamps lead frames at the proper timing, then the molding is executed.

As described above, in the transfer molding machine of the present embodiment, the lower die 10 is moved from the molding position to the first position for taking out molded products, transferring lead frames, setting resin tablets, and molding automatically.

Figure 19:
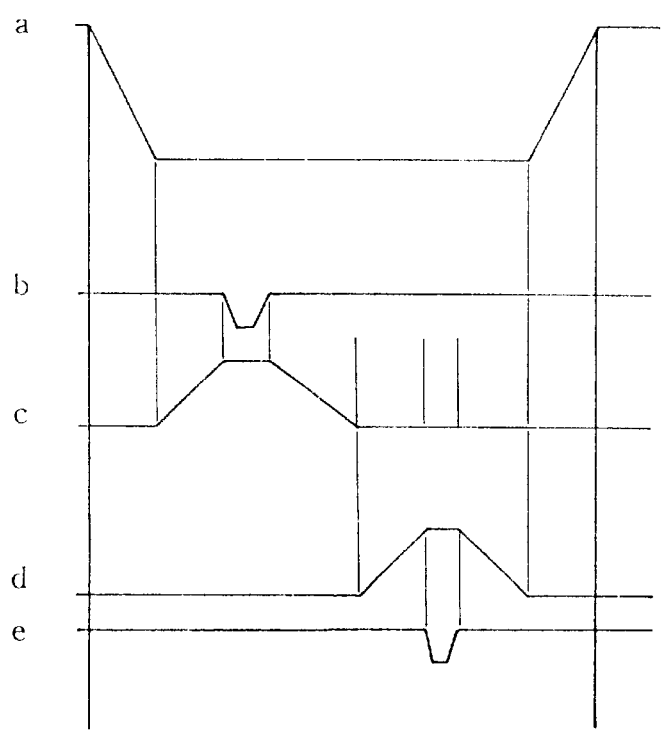
FIG. 19 is a graph showing actions of the conventional transfer molding machine.

In the present embodiment, one cycle of molding takes for, e.g., nine seconds. This cycle time is about six seconds shorter than that of the conventional machine shown in FIG. 19, so a high speed transfer molding machine can be realized.

The reason why the cycle time can be shortened is that the unloading mechanism and the parts-loading mechanism can be effectively operated because the lower die 10 is moved from the molding position to the first position, so that the cycle time of the present machine can be shorter than that of the conventional machine, in which an unloader and a parts-loader goes into a press unit. Namely, in the present embodiment, upon disengaging the positioning blocks of the lower die 10 and the upper die 40, the lower die 10 can be immediately moved, it is no need to wait until the lower die 10 and the upper die 40 completely opens. In the conventional machine, the stroke of the lower die or the upper die must be long because a wide space for inserting the loader is required, so that time for mold opening must be longer. When the lower die 10 reaches the first position, molded products can be immediately taken out by the unloading mechanism C, and mold closure can be independent to the return movement of the parts-loading mechanism.

Furthermore, lead frames are not transferred at the molding position but at another position, wide spare spaces can be reserved, so it will be easier to arranging each mechanisms, to take out molded products, and to set lead frames.

Note that, the structures of the unloading mechanism C and the parts-loading mechanism D are, of course, can be modified according to types of the transfer molding machine. For example, arrangement of the unloading mechanism C and the parts-loading mechanism D may be changed, and the tablet-setting mechanism may be provided to the parts-loading mechanism instead of the unloading mechanism. Since resin tablets and lead frames can be set simultaneously, the tablet-setting mechanism may be provided to the parts-loading mechanism so as to shorten the cycle time.

In case that, as described above, resin tablets and lead frames are separately supplied by the unloading mechanism C and the parts-loading mechanism D, the lead frames can be kept clean until transferring. In the conventional transfer molding machine, if lead frames and resin tablets are set close, the lead frames are apt to be dirty with resin dust. Furthermore, in the conventional machine, if lead frames and resin tablets are supplied separately, operating time of the loader must be longer and the cycle time also must be longer. On the other hand, in the machine of the embodiment, the unloading mechanism and the parts-loading mechanism are effectively operated, so that lead frames and resin tablets can be set effectively.

In the present embodiment, the lower die 10 is a multi pot type die, but the present invention can be applied to other types. And the insert-parts are the lead frames of the semiconductor devices but the present invention can be applied to other products.

What is claimed is:

1. A method for transfer molding, in a transfer molding machine comprising:
    a mold having an upper die and a lower die;
    a plurality of pots being provided in said lower die; and
    a plurality of plungers being provided, respectively, in each said pot in said lower die, said plungers being capable of moving in said pots and a plunger holder operatively connected to said plurality of plungers for imparting mutual movement to said plurality of plungers from beneath said lower die, said plunger holder being detachably connected to a platen for imparting movement to said plunger holder and said plurality of plungers, said method comprising the steps of:
    setting insert-parts into said mold;
    supplying resin tablets into said pots;
    clamping said insert-parts by said upper die and said lower die; and
    exerting pressure on resin melt by imparting movement to said platen and said plunger holder for imparting mutual movement to said plurality of plungers disposed in said lower die, so as to fill cavities in said mold with said resin, wherein said insert-parts are clamped and molded at a molding position at which said upper die and said lower die are faced relative to each other;
    opening said mold after molding, wherein said lower die and said plurality of plungers are simultaneously moved to a first position, adjacent to a side of the molding position; and
    removing molded products from said lower die at the first position for inserting parts for next molding operation and supplying resin tablets for next molding operation, then returning said lower die to the molding position for the next molding, wherein said transfer molding machine further comprises:
    an unloading mechanism for taking out said molded products and cleaning said lower die, said unloading mechanism being capable of moving between the position above the first position and a first switching position, which is on one side of the first position; and
    a parts-loading mechanism for setting said insert-parts into said lower die, said parts-loading mechanism being capable of moving between the position above the first position and a second switching position, which is on the other side of the first position, and
    wherein said method further includes the following steps:
    moving said unloading mechanism to the position above the first position before said lower die is moved to the first position;
    removing the molded products by said unloading mechanism upon said lower die reaching the first position, and cleaning a parting face of said lower die during the movement toward the first switching position; and
    moving said parts-loading mechanism from the second switching position to the position above the first position for setting next insert-parts into said lower die while said unloading mechanism moves to the first switching position.

2. A transfer molding machine comprising:
    a mold having an upper die and a lower die, said mold being capable of clamping insert-parts, which are set in said lower die, by said upper die and said lower die;
    a plurality of pots being provided in said lower die; and
    a plurality of plungers being provided, respectively, in each said pot in said lower die, said plungers being capable of moving in said pots and a plunger holder operatively connected to said plurality of plungers for imparting mutual movement to said plurality of plungers from beneath said lower die, said plunger holder being detachably connected to a platen for imparting movement to said plunger holder and said plurality of plungers and exerting pressure on resin melt by imparting movement to said platen and said plunger holder for imparting mutual movement to said plurality of plungers disposed in said lower die so as to fill cavities in said mold with said resin, wherein said lower die and said plurality of plungers are capable of moving between a molding position, at which said insert-parts are clamped and molded by said mold, and a first position, which is adjacent to a side of the molding position; and
    said transfer molding machine further comprises:
    a multi function mechanism for taking out molded products from said lower die, setting said insert-parts thereinto and supplying said resin tablets at the first position; and
    a moving mechanism for sliding said lower die between the molding position and the first position, wherein,
    said plungers are attached to and supported by said plunger holder with a T-slot, which is provided below said lower die and which has an engaging section having a T-shape in section and projecting from a bottom face of said plunger holder, and
    said engaging section is slidably fitted into a T-groove of said platen, which is capable of pressing said plungers at the molding position, said T-groove is provided in an upper end section of said platen, whereby said lower die is capable of moving between the molding position and the first position.

3. The transfer molding machine according to claim 2, wherein said multi function mechanism further comprises:
    an unloading mechanism for taking out said molded products, said unloading mechanism being capable of moving between the position above the first position and a first switching position; and
    a parts-loading mechanism for setting said insert-parts into said lower die, said parts-loading mechanism being capable of moving between the position above the first position and a second switching position.

4. The transfer molding machine according to claim 2 further comprising:
a plunger-pressing mechanism for pressing said plungers so as to eject said molded products while said lower die stays at the first position; and
a pin-pressing mechanism for pressing ejector pins while said lower die stays at the first position.

5. The transfer molding machine according to claim 3 further comprising:
a lower die cleaner for cleaning a parting face of said lower die; and
an upper die cleaner for cleaning a parting face of said upper die when said lower die moves to the first position.

6. The transfer molding machine according to claim 5 wherein said lower die cleaner has a brush for brushing the parting face of said lower die and a vacuum mechanism for removing dust from the lower die.

7. The transfer molding machine according to claim 3 wherein said unloading mechanism has a tablet-setting mechanism for transferring said resin tablets onto said lower die and setting the same into said pots.

8. The transfer molding machine according to claim 3 wherein said unloading mechanism has a degating section for removing resin scraps from said molded products.

9. The transfer molding machine according to claim 2, and further including a parts-loading mechanism for transferring insert-parts and setting the insert-parts into a mold, and a claw for moving said insert-parts and arranging the insert-parts.

10. The transfer molding machine according to claim 9, wherein said claw can be rotated with respect said parts-loading mechanism.

11. The transfer molding machine according to claim 9, further comprising a preheater for preheating said insert-parts, which have been arranged, before transferring the same to said mold.

12. A transfer molding machine comprising:
a mold having an upper die and a lower die, said mold being capable of clamping insert-parts, which are set in said lower die, by said upper die and said lower die;
a plurality of pots being provided in said lower die;
a plurality of plungers being provided, respectively, in each said pot in said lower die, said plungers being capable of moving in said pots and a plunger holder operatively connected to said plurality of plungers for imparting mutual movement to said plurality of plungers from beneath said lower die, said plunger holder being detachably connected to a platen for imparting movement to said plunger holder and said plurality of plungers and exerting pressure on resin melt by imparting movement to said platen and said plunger holder for imparting mutual movement to said plurality of plungers disposed in said lower die so as to fill cavities in said mold with said resin, wherein said lower die and said plurality of plungers are capable of moving between a molding position, at which said insert-parts are clamped and molded by said mold, and a first position, which is adjacent to a side of the molding position;
a multi function mechanism for taking out molded products from said lower die, setting said insert-parts thereinto and supplying said resin tablets at the first position; and
a moving mechanism for sliding said lower die between the molding position and the first position, wherein,
said lower die has a molding section and a lower die base in which said molding section is accommodated,
one end face of said lower die base is opened and closed by a shutter, whereby said molding section with said plungers can be inserted into said lower die base from the one end face, and
a lower section of said lower die base includes an aperture into which said platen, which is capable of engaging with said plunger holder with a T-slot, is slidably fitted.

13. A transfer molding machine comprising:
a mold having an upper die and a lower die, said mold being capable of clamping insert-parts, which are set in said lower die, by said upper die and said lower die;
a plurality of pots being provided in said lower die;
a plurality of plungers being provided, respectively, in each said pot in said lower die, said plungers being capable of moving in said pots and a plunger holder operatively connected to said plurality of plungers for imparting mutual movement to said plurality of plungers from beneath said lower die, said plunger holder being detachably connected to a platen for imparting movement to said plunger holder and said plurality of plungers and exerting pressure on resin melt by imparting movement to said platen and said plunger holder for imparting mutual movement to said plurality of plungers disposed in said lower die so as to fill cavities in said mold with said resin, wherein said lower die and said plurality of plungers are capable of moving between a molding position, at which said insert-parts are clamped and molded by said mold, and a first position, which is adjacent to a side of the molding position;
a multi function mechanism for taking out molded products from said lower die, setting said insert-parts thereinto and supplying said resin tablets at the first position;
a moving mechanism for sliding said lower die between the molding position and the first position;
a tablet magazine in which resin tablets to be supplied into said pots are piled;
a tablet-supplying holder having tablet holes, which are arranged to correspond to the arrangement of said pots, said tablet-supplying holder being capable of moving toward said tablet magazine; and
a transferring mechanism for transferring said resin tablets from said tablet magazine into the tablet holes of said tablet-supplying holder.

14. The transfer molding machine according to claim 13, wherein resin tablets are arranged in two zigzag lines on said tablet magazine.

15. The transfer molding machine according to claim 13, wherein said transferring mechanism has three or more claws, which are capable of grasping outer circumferential faces of resin tablets.

* * * * *